US006840868B2

(12) United States Patent
Perrier et al.

(10) Patent No.: US 6,840,868 B2
(45) Date of Patent: Jan. 11, 2005

(54) GLOW-IN-THE-DARK FILM FOR BOWLING LANES

(75) Inventors: Brent Perrier, Grand Haven, MI (US); Roy A. Burkholder, Whitehall, MI (US); Raymond R. Fineran, Jr., North Muskegon, MI (US); Jan Hansen, Kungsbacka (SE)

(73) Assignee: Brunswick Bowling & Billiards Corp., Muskegon, MI (US)

(*) Notice: Subject to any disclaimer, the term of this patent is extended or adjusted under 35 U.S.C. 154(b) by 0 days.

(21) Appl. No.: 10/792,490

(22) Filed: Mar. 3, 2004

(65) Prior Publication Data

US 2004/0171430 A1 Sep. 2, 2004

Related U.S. Application Data

(62) Division of application No. 10/224,142, filed on Aug. 20, 2002, which is a continuation-in-part of application No. 09/575,950, filed on May 23, 2000, now Pat. No. 6,450,892, which is a continuation-in-part of application No. 09/060,914, filed on Apr. 15, 1998, now abandoned, and a continuation-in-part of application No. 09/791,119, filed on Feb. 22, 2001, now abandoned, which is a division of application No. 09/427,205, filed on Oct. 26, 1989, now abandoned, which is a division of application No. 09/281,405, filed on Mar. 30, 1999, now abandoned, which is a division of application No. 08/918,652, filed on Aug. 22, 1997, now Pat. No. 5,888,142, which is a continuation of application No. 08/631,246, filed on Apr. 12, 1996, now abandoned, which is a division of application No. 08/512,476, filed on Aug. 8, 1995, now Pat. No. 5,529,541, which is a continuation of application No. 08/278,518, filed on Jul. 21, 1994, now Pat. No. 5,489,241.

(51) Int. Cl.$^7$ .................................................. A63D 1/04

(52) U.S. Cl. ............................ 473/54; 473/115; 156/67

(58) Field of Search ................................ 473/115, 116, 473/108, 54, 55, 58; 273/DIG. 24; 250/483.1, 484.2; 106/31.15; 252/301.16, 301.35; 156/67

(56) References Cited

U.S. PATENT DOCUMENTS

| | | | | | |
|---|---|---|---|---|---|
| 2,441,559 | A | * | 5/1948 | Burrell et al. | 250/462.1 |
| 3,892,972 | A | * | 7/1975 | Cevasco | 250/458.1 |
| 3,922,232 | A | * | 11/1975 | Schein | 252/301.35 |
| 4,197,151 | A | * | 4/1980 | Muzik | 156/249 |
| 4,769,265 | A | * | 9/1988 | Coburn, Jr. | 428/40.4 |
| 4,944,514 | A | * | 7/1990 | Suiter | 473/117 |
| 5,316,608 | A | * | 5/1994 | Ocampo et al. | 156/230 |
| 5,472,381 | A | * | 12/1995 | Ayre, Jr. | 473/115 |
| 5,698,301 | A | * | 12/1997 | Yonetani | 428/213 |
| 6,395,408 | B1 | * | 5/2002 | Nelson et al. | 428/690 |
| 6,534,182 | B1 | * | 3/2003 | Oki et al. | 428/421 |
| 6,596,416 | B2 | * | 7/2003 | Nelson et al. | 428/690 |

* cited by examiner

*Primary Examiner*—William M. Pierce
(74) *Attorney, Agent, or Firm*—Dykema Gossett PLLC

(57) ABSTRACT

A glow-in-the-dark bowling game includes an enclosure with ambient lighting normally illuminating the same, and at least one bowling lane. A UV sensitive dye or pigment is incorporated into at least a portion of the upper surface of the bowling lane. A UV light source is positioned generally above the bowling lane, and is selectively operable for directing UV light onto the upper surface of the bowling lane. To play the glow-in-the-dark bowling game, the ambient lighting is dimmed or turned off, and the UV light source is turned on, causing the UV sensitive dye or pigment to emit visible light.

8 Claims, 4 Drawing Sheets

GLOW-IN-THE-DARK FILM FOR BOWLING LANES

CROSS-REFERENCE TO RELATED APPLICATIONS

This application is a divisional application of, and claims priority to, U.S. patent application Ser. No. 10/224,142 filed Aug. 20, 2002, which is a continuation-in-part of U.S. patent application Ser. No. 09/575,950, filed May 23, 2000, now U.S. Pat. No. 6,450,892 entitled BOWLING LANE RESTORATION AND SHIELDING PANEL AND ASSEMBLY; which is a continuation-in-part of U.S. patent application Ser. No. 09/060,914, filed Apr. 15, 1998, abandoned entitled BOWLING LANE RESTORATION AND SHIELDING PANEL AND ASSEMBLY; as well as U.S. patent application Ser. No. 09/791,119, filed Feb. 22, 2001, abandoned entitled FLUORESCENT BOWLING PINS; which is a divisional of U.S. patent application Ser. No. 09/427,205, Oct. 26, 1999 abandoned entitled FLUORESCENT BOWLING BALL; which is a divisional of U.S. patent application Ser. No. 09/281,405, Mar. 30, 1999 abandoned entitled FLUORESCENT BOWLING BALLS AND PINS; which is a divisional of U.S. patent application Ser. No. 08/918,652, Aug. 22, 1997 entitled ULTRAVIOLET LIGHT ILLUMINATED BOWLING GAME, now issued U.S. Pat. No. 5,888,142; which is a continuation of U.S. patent application Ser. No. 08/631,246, Apr. 12, 1996 abandoned entitled ULTRAVIOLET LIGHT ILLUMINATED BOWLING GAME; which is a divisional of U.S. patent application Ser. No. 08/512,476, Aug. 8, 1995 entitled ULTRAVIOLET LIGHT ILLUMINATED BOWLING GAME, now U.S. Pat. No. 5,529,541; which is a continuation of U.S. patent application Ser. No. 08/278,518, Jul. 21, 1994 entitled ULTRAVIOLET LIGHT ILLUMINATED BOWLING GAME, now U.S. Pat. No. 5,489,241. Priority under 35 U.S.C. § 120 is hereby claimed on each of the above-identified patent applications, and the entire contents of each is hereby incorporated herein by reference.

FIELD OF THE INVENTION

This invention relates to a bowling game, and related method, such as ten pin bowling, and more particularly to a bowling game that may be played with one or more components of the game fluorescing in relatively dark conditions as a result of sensitivity to ultraviolet light.

BACKGROUND OF THE INVENTION

As is well known, bowling such as ten pin bowling, is played in two main forms. One form is league bowling wherein a plurality of teams compete against one another. The other form is so-called open bowling, where individuals play strictly for recreational purposes and/or to compete amongst themselves on an individual basis.

Bowling proprietors, that is, the owners of bowling establishments, rely on open bowling to occupy their establishments when league play is not occurring. Without the revenue stream produced by open bowling, most proprietors would suffer financial difficulty. Consequently, it is desirable to maintain and increase the number of open bowlers using a given bowling establishment.

To accomplish this goal, variations on conventional bowling have been derived to entice open bowlers to a bowling establishment. One promotion that has worked well to attract open bowlers has been the so-called "black out promotion", often referred to as "moonlight bowling". For this, the lights of the bowling establishment are dimmed and lighting above the lane eliminated entirely. Moonlight bowling is especially popular with bowling proprietors because the relaxed, fun atmosphere that results attracts customers who are often not regular bowlers. These new customers then provide the means whereby the number of open bowlers using an establishment may be maintained and/or increased to thereby maintain and/or increase the revenue stream generated by open bowling.

While the advent of moonlight bowling has indeed succeeded in attracting non-regular bowlers, it remains nonetheless a goal of a bowling proprietor to achieve an even greater increase in non-regular bowlers attending his or her establishment. The present invention is directed to achieving that object.

This invention also relates to ten pin bowling lanes and other indoor bowling lanes, such as five pin and duck pin bowling lanes. It is especially useful for a reconstructed bowling lane surface, in a method of preparing a bowling lane surface, and as a bowling lane surface protecting material over wood or synthetic lanes.

Bowling lane assemblies are composed of an elongated lane, a wider approach section at the foul line end, and a pin deck on the pin deck end. These lanes are primarily of two main types. One type is formed of joined wood boards. The other type has a synthetic surface on a support base such as pressed wood. Both types are mounted on an elevating support structure.

After a period of use of the lane, the action of bowling balls on the lane surface and repeated refinishing of the surface create wear and dents requiring resurfacing or reconstruction of the lane. A conventional way of treating the lane is to sand it down and apply a new finish coat to it. Another more recent technique for resurfacing bowling lanes is to cover the lane with a thin flexible tape or film 0.076 to 0.178 mm (3 to 7 mils) thick and having an undersurface coated with adhesive, not totally unlike a giant roll of cellophane tape, as described in commonly assigned U.S. Pat. Nos. 4,795,152 and 4,867,816.

This later technique has been found to be effective for many bowling establishments and has been widely used. However, it is not universally applicable, and it requires considerable skill and effort to avoid problems associated with the large underside adhesive surface area. The film must be carefully controlled as it is being unrolled and laid in order to minimize air pockets, misalignment, and other difficulties from an adhesive material of this nature. One specific difficulty, which arises when using this film, occurs due to seasonal movement in boards for wooden lanes. Because the material is adhered to the entire surface of the lane, the expansion and contraction of the wood boards can cause waves or tunneling of the film material resulting in a lane surface that is not smooth. Later removal of the film also destroys the film.

Additionally, the film material is thin and does not prevent the wood underneath from being dented by the ball or pins. Abrasive material or sharp pieces on the ball may penetrate the thin film. The ball can also penetrate the film used in this technique if the film is not cared for properly. The film lasts only three to ten years.

Rigid synthetic lane panels are also sometimes used to reconstruct lane surfaces. However, this is extremely expensive and leaves joints between the panels. The panels are usually about ½ inch thick and 12 feet long phenolic or phenolic pressed wood panels.

It would be advantageous to be able to protect new lanes from the need to recondition them, or if worn, to protect them against further wear, and thereby extend their useful life indefinitely.

SUMMARY OF THE INVENTION

An object of the invention is to provide a new and improved bowling game. More specifically, one object of the invention to provide a variation in a bowling game that is particularly suited to attracting bowlers to open bowling at a bowling establishment, and to otherwise provide a variation on a conventional bowling game.

According to one facet of the invention, a bowling establishment is provided. The same includes an enclosure that may be selectively darkened. An elongated bowling game surface component is located in the enclosure and is flanked by gutter components. Bowling game pin components are located in the enclosure for disposition on the surface component. Similarly, bowling game ball components are disposed in the enclosure and are adapted to be rolled on the surface component at the pin components disposed thereon.

The enclosure includes selectively operable conventional lighting means for normally illuminating the enclosure. Also, included is an ultraviolet lighting means in the enclosure which is selectively operable for directing ultraviolet light at the surface component, the pin components disposed thereon, and ball components rolled thereon. An ultraviolet light sensitive dye or pigment is disposed on at least one of the components at or sufficiently near the surface thereof as to visibly fluoresce when exposed to the ultraviolet lighting means. As a consequence, the enclosure may be selectively darkened, with the conventional lighting means wholly or partially turned off, and the ultraviolet lighting means operated so that the dye or pigment will fluoresce within the darkened enclosure as a bowling game is played therein.

The use of a fluorescing ultraviolet light sensitive dye or pigment adds a novel feature to so-called "moonlight bowling", which is attractive to bowlers and draws them to the establishment having the same.

In another embodiment of the invention, the component provided with the dye or pigment is the bowling surface component. Alternatively, it may be the gutter components.

In yet another embodiment of the invention, the components having the dye or pigment are the bowling pin components.

In still another embodiment of the invention, the components having the dye or pigment are the ball components.

The invention also contemplates that any two, three, or all of the components may be provided with the ultraviolet light sensitive dye or pigment.

According to yet another aspect of the invention, there is provided a bowling lane which includes an elongated structure having an upper, planar surface on which bowling balls may be rolled. An ultraviolet light sensitive dye or pigment is on the structure so as to be visible at the planar surface when fluorescing. The dye or pigment substantially covers either the entirety or simply part of the planar surface.

Included is a selectively operable source of ultraviolet light which is directed at the planar surface so that substantially the entirety of the surface or the selected part will be illuminated by fluorescence of the dye or pigment when the light source is operating.

In still another aspect of the invention, the bowling lane as just described includes a film covering substantially the entirety of the planar or upper surface, and an adhesive is interposed between the film and the upper surface for adhering the film to the upper surface. The ultraviolet light sensitive dye or pigment is incorporated in the bowling lane.

In one preferred embodiment, the dye or pigment is incorporated in the film and/or the adhesive. Preferably, the dye or pigment is present in the range of 0.2 to about 3.0 weight percent of the dry adhesive. The invention contemplates that the adhesive be present in an amount in the range of about 10 to about 150 pounds dry adhesive per 3,000 square feet of the upper surface. Most preferably, the dye or pigment is substantially colorless under normal lighting conditions or in daylight. Preferably, the film is transparent.

According to still another facet of the invention, there is provided an ultraviolet light fluorescing protective coating for a bowling lane, which includes a thin transparent film of a material selected from the group consisting of polyesters, polycarbonates, polystyrenes, polypropylene, polyethylene, polyvinyl chloride, acrylics, polyurethane, fluorocarbon polymers, and nylon. A pressure sensitive adhesive is disposed on one side of the film and is selected from the group consisting of acrylic, vinyl acrylic copolymer, rubber resin, and silicone pressure sensitive adhesives. An ultraviolet light sensitive dye or pigment that is essentially colorless in daylight but which fluoresces in ultraviolet light is disbursed in the adhesive.

In a preferred embodiment, the protective coating that has the adhesive coated on the film is an amount in the range of about 10 pounds to about 150 pounds per 3,000 square feet of surface of the one side of the film. The film may be polyethylene terephthalate polyester, and the adhesive may be a vinyl acrylic copolymer adhesive. The novel method, materials, and combination protect new or reconditioned lanes from wear. It also avoids difficulties associated with the above-mentioned previously patented development.

An aspect of this invention is to provide a unique method, sheet material, and resulting lane construction that can be readily manufactured in extruded form, can be readily installed, neither utilizes nor requires adhesive spread over the undersurface of the material, and is readily removed and replaced, if necessary, at a later date. Typically, but not necessarily, the method employs small strips of double-sided tape or other adhesive means or any type of mechanical fastening system at select locations for installation and retention of position. It protects the lane, whether of wood or synthetic material, and extends the life of the lane. It can also be used to revamp damaged sections of a lane.

The method achieves resurfacing of a bowling lane, even the approach and pin deck area if desired, with a sheet of flexible, relatively thick, polymer having a thickness of about 0.63 to 2.50 mm (25–00 mils), uncoated with adhesive. The side edges of the lane covering polymer sheet can be trimmed, and then the end edges trimmed, if necessary. Any initial waves in the laid extruded sheet have been found to basically disappear after being pushed down by a towel bar from the foul line to the pin deck. The polymer sheet may be one layer of clear 100 percent polycarbonate.

The extruded polymer sheet may also comprise a first layer and a second layer underlying the first layer. The first layer may be 100 percent polycarbonate or alternatively, may be a mixture of about 5–0 percent of a lubricious polymeric material, i.e., Teflon®, and correspondingly about 80–5 percent polycarbonate. When 100 percent polycarbonate is used, the total thickness of the first layer is about 25 percent of the total thickness of the extruded polymer sheet. When the first layer is made of polycarbonate and Teflon®, the first layer is about 5–0 percent of the total thickness of the extruded polymer sheet.

The first layer may contain an optical brightener, which may include a fluorescent dye that is responsive to ultraviolet light. The sheet may optionally include a third layer beneath the second layer. The optional second and third layers may contain a tinting dye or an ultraviolet blocking agent to avoid uneven glow appearance from substances beneath the film in the wood, etc. A replaceable decorative film, advertising material or web printed material of chosen design and color may be placed beneath the applied polymeric sheet or printed on the surface, usually on the bottom, of the polymer sheet as well.

Other objects and advantages will be apparent from the following specification taken in connection with the accompanying drawings.

DETAILED DESCRIPTION OF THE PREFERRED EMBODIMENTS

Figure 1:
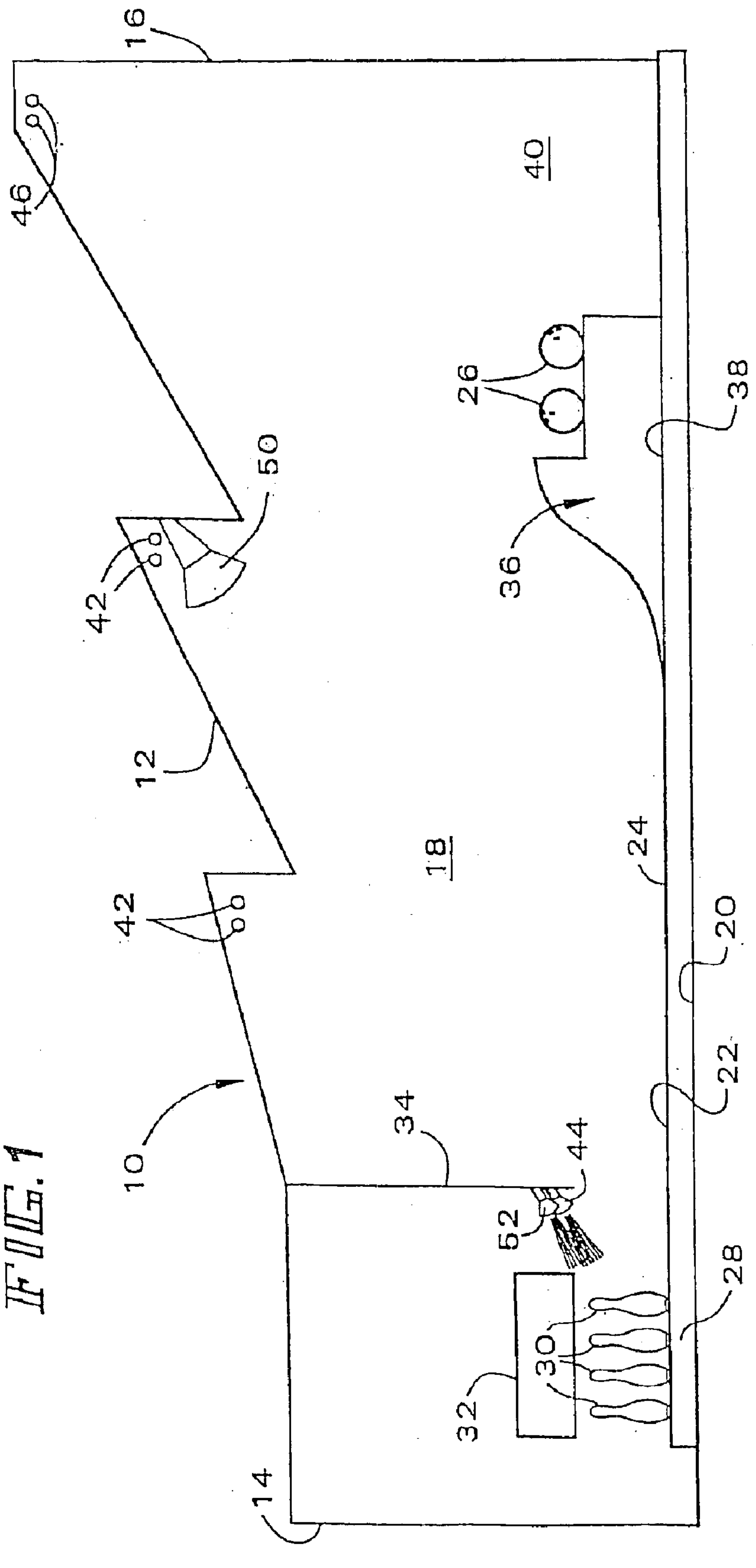
FIG. 1 is a somewhat schematic side elevation of a bowling establishment made according to the invention.
Figure 2:
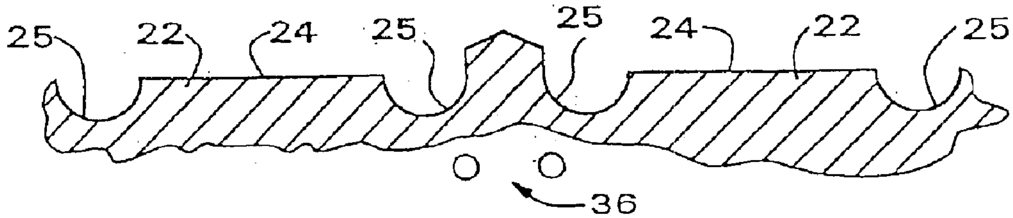
FIG. 2 is a somewhat schematic sectional view taken at right angles to the view of FIG. 1.

An exemplary embodiment of a bowling establishment made according to the invention is illustrated in FIG. 1 in a somewhat schematic form. The same includes an enclosure, generally designated 10, having a ceiling 12 with a saw tooth configuration, opposed end walls 14 and 16, sidewalls 18 (only one of which is shown), and a floor 20. Supported on the floor 20 is a plurality of bowling lanes 22 in side-by-side relation as is well known. The lanes 22 may be either natural wood construction or so-called synthetic lane construction, and each has an upper surface 24 which is planar and which is flanked by gutters 25 (FIG. 2). The surface 24 is adapted to have one or more bowling balls 26 rolled thereon toward the pit end 28 thereof. As is well known, bowling pins 30 are spotted in a triangular configuration on the bowling surface 24 at the pit end 28, usually by an automatic pinsetter, shown schematically at 32.

The pinsetter 32 is hidden by a so-called masking unit 34, which may be of conventional construction. A ball return and rack, generally designated 36, is located near the approach end 38 of the lanes. An area 40, shown extremely condensed in FIG. 1, to the right of the approach end 38 of the lane 24 may house the usual amenities, such as seating for the bowlers, a bar and/or grill, an area for entertaining children, equipment storage, and rental locations, etc.

In the usual case, the enclosure 10 would be relatively window free. The windows, if any, will generally be located adjacent the area 40 and will severely limit the amount of light entering the establishment 10. For this reason, the ceiling 12, and the saw tooths thereof, is provided with conventional lane lighting, typically in the form of several fluorescent tubes 42. In addition, conventional lamps 44 may be disposed behind the masking unit 34 so as to illuminate the pit end 28 of each of the lanes 22.

In the area 40, additional conventional lighting in the form of selectively operable fluorescent lighting tubes 46 is located.

According to the invention, each lane 22 or lane pair is provided with at least one ultraviolet light source. In a preferred embodiment, one such light source is shown at 50 and is located in one of the saw tooths of the ceiling 12, while another is given the reference numeral 52 and may be mounted behind the masking unit 34.

In a highly preferred embodiment, the light sources 50 and 52 are selectively operable and emit electromagnetic radiation, preferably at least a portion of which is ultraviolet light, at a wave length in the range of about 200 to 400 nanometers. Shorter wave lengths are not preferred as being potentially environmentally unsound.

According to the invention, one or more of the bowling components in the enclosure 10 is provided with an ultraviolet light sensitive dye or pigment at or in sufficiently close proximity to its surface, such that the dye or pigment will visibly fluoresce when subject to the ultraviolet light emitted by the sources 50 and 52. By definition, a material that “fluoresces” or that is “fluorescent” is a material that emits visible light when exposed to electromagnetic radiation. More specifically, a “fluorescent” material is one that emits visible light during such time that the material is irradiated with electromagnetic radiation, which may be visible or non-visible to humans. To enhance the effect of the fluorescing component, it is contemplated that a proprietor of the establishment 10 would turn off the lane illuminating lights 42, 44 and dim or turn off the lights 46. Inasmuch as the lights 46 illuminate an area 40 that might house a bar, a grill, etc., generally speaking, the lights 46 will only be dimmed.

If the bowling lane surface 24 is the component provided with the dye or pigment, generally only the source 50 will be illuminated. However, if the pins 30 are provided with the dye or pigment, the ultraviolet light source 52 will be illuminated.

Alternatively, if the balls 26 are provided with the dye or pigment, those of the ultraviolet light sources 50 and 52 may be illuminated.

As a preferred embodiment of the invention, the surface 24 is preferably provided with the dye or pigment. However, the gutters 25, balls 26, and/or the pins 30 may be the only components provided with the dye or pigment. Alternatively, any two, three, or all four of the components may be provided with the dye or pigment.

Figure 3:
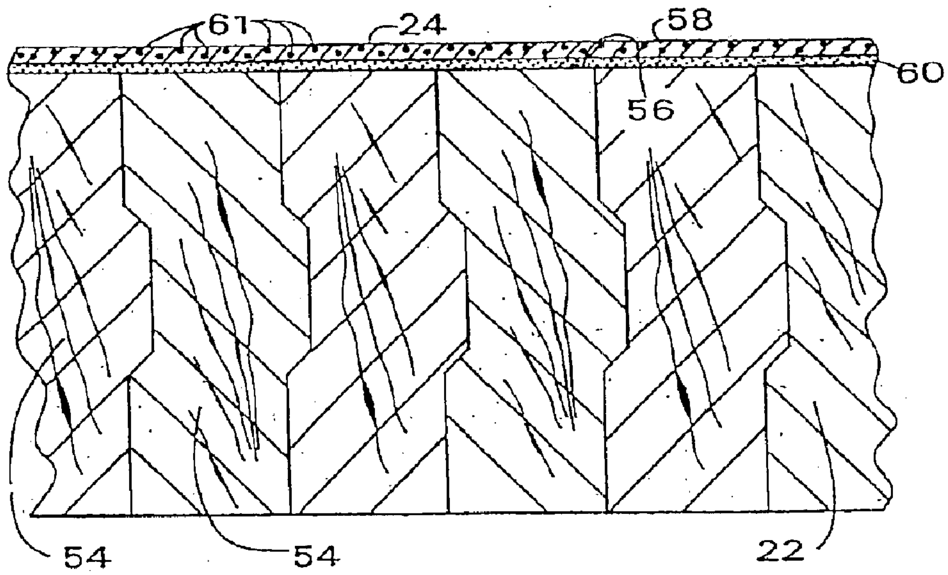
FIG. 3 is an enlarged, fragmentary sectional view of a bowling lane made according to the invention.

Turning now to FIG. 3, the bowling lane 22 and the preferred manner of incorporating the dye or pigment therein, will be described. The lane 22 may be made up of a series of side-by-side boards 54 which, depending upon the location on the lane, will be made of pine or hardwood, such as maple. Alternatively, the boards may be covered with a synthetic lane construction or dispensed with entirely. In the preferred embodiment, the boards 54 have their upper surface 56 covered by a protective coating generally of the type sold under the trademark "Guardian". This type of protective coating is disclosed more fully in U.S. Pat. Nos. 4,795,152; 4,867,816; and 4,944,514 to Suiter. The protective coating includes a clear, transparent, colorless film 58 of a thickness that typically will be in the range of 3 to 7 mils adhered to the upper surface 56 of the boards 54 by a layer of transparent pressure sensitive adhesive 60.

In a preferred embodiment, the film 58 is selected from the group consisting of polyesters, polycarbonates, polystyrenes, polypropylene, some types of polyethylene, polyvinyl chloride, acrylics, polyurethane, fluorocarbon palmers, and some grades of nylon. In a highly preferred embodiment, the film is a polyethylene terephthalate polyester.

The adhesive 60 is a pressure sensitive adhesive selected from the group consisting of acrylic, vinyl acrylic copolymer, rubber resin, and silicone pressure sensitive adhesives of various sorts. A preferred adhesive is a vinyl acrylic copolymer adhesive.

According to the invention, the adhesive 60 is present in the range of 10 to 150 pounds of dry adhesive per 3,000 square feet of the surface of the film 58 to which it is applied. A preferred coating weight is 44 pounds of dry adhesive per 3,000 square feet of film surface.

Many types of known ultraviolet light sensitive dyes or pigments may be used. Selection of a particular dye or pigment will typically depend on the desired color to be generated when the dye fluoresces. A preferred dye is that known as "Columbia Blue"—Day-Glo Tracer Dye D-298 available from Day-Glow Color Corporation of Cleveland, Ohio. This particular dye is essentially colorless in daylight, but fluoresces intense blue under ultraviolet light. It fluoresces brilliantly under ultraviolet light having a wave length in the range of 360 to 380 nanometers.

It is desirable that the dye be colorless under normal light or daylight so that its presence in the coating, film 58, or the adhesive 60 cannot be seen.

Preferably, the dye is used in the range of about 0.2 to about 3.0 weight percent of the dry weight of the adhesive.

The dye material may be disbursed in the adhesive 60 by any of a variety of conventional means.

Figure 4:
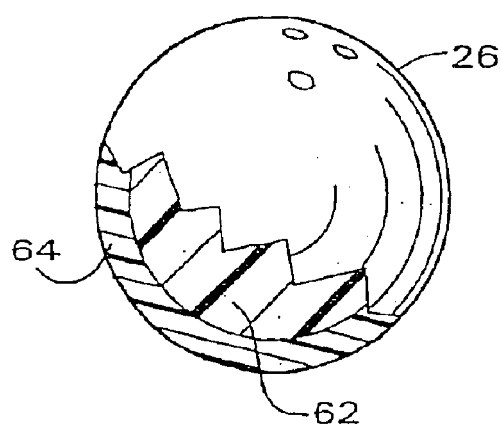
FIG. 4 is an elevation of a bowling ball made according to the invention with part of the same broken away.

As noted previously, the ultraviolet light sensitive dye or pigment may also be coated on the gutters 25 along their length. It may be incorporated in the bowling balls 26. With reference to FIG. 4, as is well known, a conventional bowling ball is typically made up of an internal core 62, which may take on any of a variety of different shapes and which may be one or more pieces. The core 62 is surrounded by a cover 64. In the usual case, the cover 64 will be made up of polyester or urethane resins.

According to the invention, the dye or pigment, in dry form, may be ground up and mixed in with the cover stock used to form the cover 64. Generally speaking, because of the thickness of the cover 64, it will be desirable to use a higher weight percent of the dye or pigment than incorporated in the adhesive 60 to assure that a sufficient amount of the dye or pigment is at the surface of the ball so as to fluoresce when subject to ultraviolet light. Alternatively, the ball may be coated with a finish containing the dye.

Figure 5:
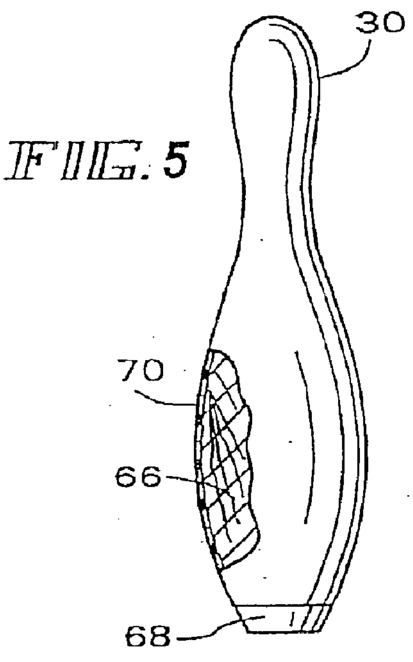
FIG. 5 is an elevation of a bowling pin made according to the invention, again with part of the same broken away.

Additionally, the pins 30 may incorporate an ultraviolet light sensitive dye or pigment. As seen in FIG. 5, a typical pin 30 includes a wooden core 66 provided with a plastic base 68. The core 66 is encapsulated in a protective skin 70. The skin 70 may be formed of any of a variety of materials as for example, the polymeric material sold under the registered trademark "Syrlyn". In this case, again, a dry dye or pigment is ground up and mixed into the Surlyn prior to its application to the pin core 66, and again, it may be necessary to use a larger weight percent of dye or pigment than with the adhesive 60 for the reason mentioned previously in connection with the ball 26.

Of course, in some instances, it may be desirable to simply paint an ultraviolet light sensitive dye or pigment containing finish or coating on an object. In such a case, the dye or pigment may be mixed into a polyurethane coating material. For example, if the gutters 25 associated with the lane 22 are to be provided with the fluorescing dye or pigment, they may be painted with a conventional polyurethane finishing material containing the dye or pigment.

When the bowling surface is to fluoresce, substantially its entire surface or some selected part of its surface will be provided with the dye. If only a selected part is to be provided with the dye, it typically, but not always, will be that part of the lane nearest the pin deck 28. In some cases, a "hybrid" installation may be used. For example, film 58 with a dye containing adhesive 60 may be installed at the approach end of the lane to provide protection for the bowling surface in the area where it takes the most abuse, and a dye containing coating or finish used elsewhere on the lane.

To the extent that a bowling establishment or bowling lane or protective coating made according to the invention can be visualized from the foregoing description, it will be appreciated that when in use and with the dye or pigment fluorescing while being exposed to ultraviolet light in a darkened establishment, a somewhat eerie, but nonetheless mysteriously pleasant sensation, is felt by the observer. The components incorporating the dye or pigment cast a glow perceptible to all observers but not easily described. The novelty thereof is attractive to many people, and as a consequence, provides a novel addition to a conventional bowling game that is extremely well received by bowlers.

Referring now to FIGS. 6–11, a two lane bowling facility is shown to illustrate the invention, it being realized that typical bowling centers have a large number of lanes, usually in pairs like this. This two lane arrangement 110 includes the two lane assemblies 112 and 112' in a typical arrangement with each lane 114 being straddled by a pair of gutters 116. Between the two lane assemblies is a ball return capping 118, which is above a ball return channel of typical type. At the opposite sides of the two lanes from the ball return capping are lane divisions 120 of typical type.

Each lane 114 is of standard length, i.e., 60 feet plus or minus ½ inch as measured from the foul line 122 to the center of the number one pin on the pin deck 124. At the head end of the lane, i.e., adjacent foul line 122, is what is known as the approach 126. The approach 126 is where the bowler advances toward the lane with the ball in hand in order to bowl the ball down the lane toward the pins on the pin deck 124. These pins are graphically illustrated as ten pins in the typical triangular configuration with number one pin being at the front apex of the triangle and numbers seven and ten pins being at the rear apices or corners of the triangle. The lane is of standard width of 41½ inches plus or minus ½ inch, according to the standards of the American Bowling Congress (ABC).

The invention shown in FIGS. 6–11 will sometimes be used to restore or recondition a lane which has become worn due to ball indentations, ball tracking marks, blemishes, pin indentations, and general wear due to repeated traverse of the lane by balls and by a conventional lane conditioner. Alternatively, the invention can be used to complete, i.e., finish off, a new lane of wood or of synthetic material. If the lane is a worn lane, it is preferably sanded to remove ball dents and other cosmetic problems before the sheet material of this invention is installed, and preferably, a wood lane has a slightly rubbery base coat lane finish applied to it to seal the wood, which prevents liquids from wicking between the sheet and lane. If the lane is in good condition, the sheet material of this invention can be installed on top of the existing wood lane finish or the synthetic lane. One variation is to sand and apply base coat only to the approximately first ⅓ of the lane from the approach since this is where most ball damage occurs. Then, the novel sheet material is applied to the lane. If it is later decided to recondition the entire length of the lane, the novel sheet material and lane protection layer can be readily removed from the lane, the lane reconditioned, and the novel sheet material replaced over the length of the lane.

In contrast to the prior teachings, wherein a very thin film, e.g., about 0.076 to 0.178 mm (3 to 7 mils), having an adhesive over its lower surface, is carefully unrolled and adhered over the length of the lane, the present sheet is of substantial thickness of about 0.63 to 2.50 mm, preferably 1.25 mm thick, and is not coated with adhesive. In the depicted embodiment of FIG. 6, the extruded polymer sheet 130, preferably made of polycarbonate, extends over the length of the lane from the foul line 122 to the rear edge of the pin deck 124. However, the extruded polymer sheet may cover the approach, the lane, and the pin deck or any one of these areas individually or in combination. One or more sheets may be used.

Figure 6:
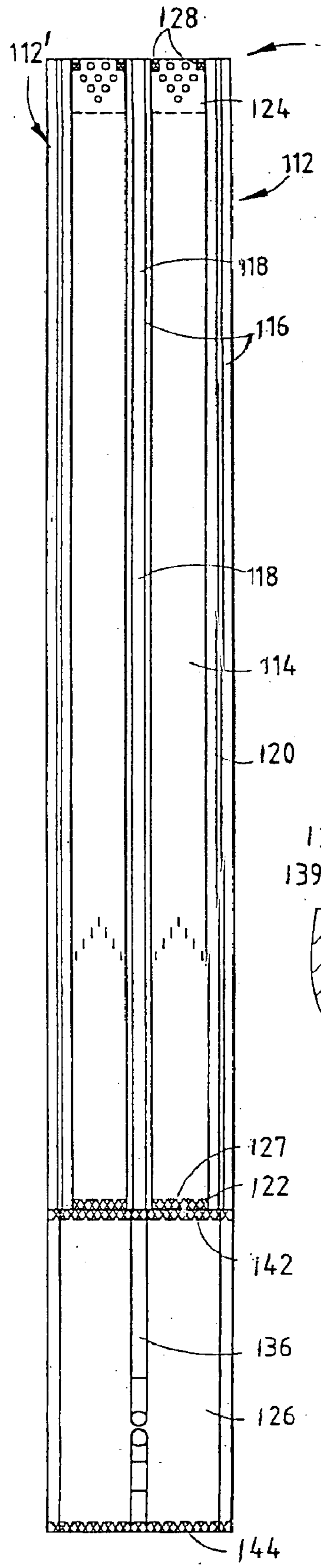
FIG. 6 is a plan view of a pair of bowling lanes, gutters, ball return zone, approaches and pin decks embodying the present invention.

In the typical instance, the polymer sheet extends from the foul line 122 to the rear edge of the pin deck 124. The polymer sheet is not typically glued to the entire lane. Rather, the foul line end portion of the sheet is attached by an adhesive means or any type of mechanical adhesive means, and the central area of the lane remains free of adhesive. Preferably, the adhesive is a narrow strip of thin double-sided adhesive tape 127, preferably about 0.1 mm thick, extends substantially the width of the lane, and is positioned between extruded polymer sheet 130 and the lane surface, i.e., beneath the sheet and on top of the lane surface. The sheet 130 is preferably relatively stiff when flat. This leading edge is what primarily holds the sheet in position. However, static forces also assist in retaining the sheet in position, especially over the central area of the lane. At the far end of the lane, i.e., at the rear of pin deck 124, the polymer sheet 130 may be secured to the underlying lane surface by a pair of laterally spaced strips of thin double-sided adhesive tape 128 (FIG. 6). It is presently preferred to have these strips of tape basically at the corners, i.e., adjacent the number seven and number ten pin locations. The double-sided tape 127 at the foul line is preferably about 2 inches wide. The double-sided tape at 128 preferably is in pieces of about 2 inches wide by 4 inches long in dimension, both being very thin, preferably about 0.1 mm thick. The polymer sheet may be a substantially clear sheet made of 100 percent polycarbonate.

In another embodiment, the extruded polymer sheet 130 may also comprise a first layer 135 and a second layer 137 underlying first layer 135. First and second layers 135 and 137 are preferably co-extruded. The extruded polymer sheet is clear, i.e., transparent, when polycarbonate is used to form the extruded polymer sheet. The extruded polymer sheet may be provided with selected decorative effects underneath it. These decorative materials can be inserted as a film or web and removed at will since the polymer sheet is not glued to the lane over its length. The decorative effects or advertising material may also be printed on or under the polymer sheet. Thus, for example, the undersurface material can have a simulated wood appearance, advertising material, or any suitable design or wording to suit special occasions or environments. The second layer 137 can include in its thickness a coloring agent, an ultraviolet light blocker material, and/or an ultraviolet responsive pigment or dye material that is responsive to ultraviolet light to provide a special glow-in-the-dark effect similar to that described in U.S. Pat. Nos. 5,489,241; 5,529,541; and 5,888,142, the disclosures of which are incorporated herein by reference. Incorporation of the ultraviolet responsive material into the second layer is advantageous because, should scratches occur in the first layer, this will not adversely affect the ultraviolet lighting characteristics of the lanes. Nevertheless, the ultraviolet responsive material could alternatively be incorporated in the first layer.

The first layer 135 may comprise between about 5–20 percent of a lubricious polymeric material, i.e., Teflon® (tetrafluoroethylene fluorocarbon, fluorinated ethylene propylene, or copolymers thereof), and correspondingly 80–95 percent polycarbonate instead of being 100 percent polycarbonate material. When this is done, the thickness of the first polycarbonate layer is about 5–50 percent of the total thickness of the extruded polymer sheet. An extruded layer of Teflon®/polycarbonate can be made by feeding beads, which are made of 5–20 percent Teflon® and correspondingly 80–95 percent polycarbonate, into the extruder.

According to another embodiment, the extruded polymer sheet is composed of three laminated layers underlying one another including a first polycarbonate layer, which is clear and may optionally include a lubricious polymeric material such as Teflon® and/or an optical brightener, a second polycarbonate layer that is clear and contains an ultraviolet responsive pigment or dye, a color tint material, and an ultraviolet light blocker material, and a third polycarbonate layer, which also is clear. The third layer may contain an ultraviolet light blocking agent to protect the lane from fading, a color tint material, an optical brightening material, and/or an ultraviolet light blocker alone or in any combination. Preferably, the first, second, and third layers are co-extruded. Due to the co-extrusion, the first, second, and third layers do not necessarily form discrete layers.

The use of Teflon® in combination with polycarbonate in the first layer of the extruded polymer sheet reduces friction on the lane and creates a slightly white color. When Teflon® is added to the first layer, however, the coefficient of friction of the upper surface of the sheet material is comparable to that of an oiled lane surface. The slightly white color of the Teflon®/polycarbonate first layer is an advantage because it brightens the bowling lane under normal lighting conditions. Bowlers find bright lanes more appealing. The Teflon®/polycarbonate first layer also typically creates a bowling surface with better texture. When the Teflon® is incorporated into the first or only layer, the extruded polymer layer is less glossy and has a generally matte appearance, making a matte finish treatment unnecessary. When Teflon® is incorporated into the first layer, except for the relative thickness changes discussed above, the composition of the second and third polycarbonate layers, when used, remains as discussed above. Whether or not Teflon® is used as a component in the first layer, the first or second polycarbonate layers may contain ultraviolet responsive pigments or dyes. The ultraviolet responsive pigment or dye may be a fluorescent, glow-in-the-dark material that may have a slightly brown appearance under normal lighting conditions, or it may be clear with no visible coloration under normal lighting conditions. Of course, any combination of glow-in-the-dark ultraviolet responsive pigments or dyes may be used or the pigment or dye may be omitted entirely from the second polycarbonate layer in both embodiments. Likewise, as discussed above, the third layer may contain an ultraviolet light blocker, which protects the wood surface of the lane from becoming damaged.

Figure 7:
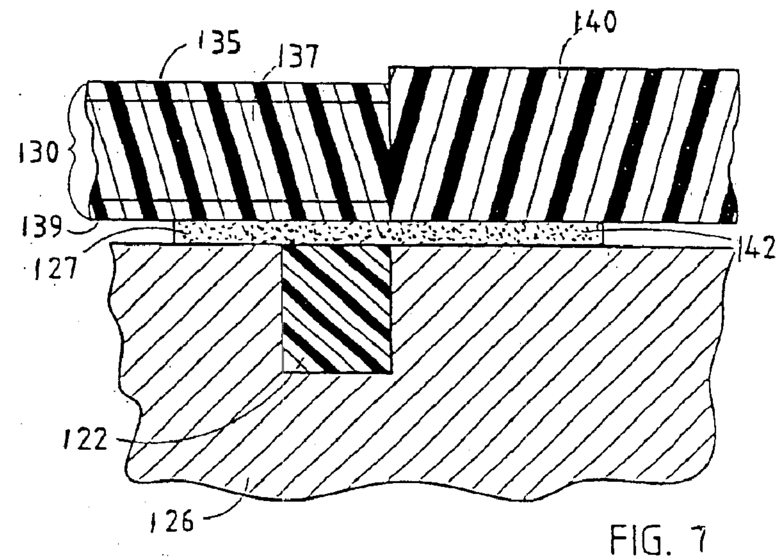
FIG. 7 is a greatly enlarged, fragmentary side elevational view of one embodiment of the juncture of the approach and the lane at the foul line.

As discussed previously, the polymer sheet may be substantially clear 100 percent polycarbonate only. The approach 126 may or may not have a polymer sheet 140 applied. If it is applied, preferably the sheet 140 (FIG. 7) on the approach will be at least as thick and preferably slightly thicker than sheet 130 on the lane so as not to interfere with the sliding action of the bowler. For example, if the sheet 130 is 1.25 mm thick, sheet 140 is preferably between 1.5 to 2.0 mm thick up to the foul line 122 (FIG. 7). Since this approach cover sheet is traversed by the bowler who also slides on it, it has its forward edge adjacent the foul line secured by a thin layer 142 of adhesive or double-sided adhesive tape extending across the entire width of the approach layer 140, and at the rear edge of the approach, a layer 144 of thin double-sided adhesive tape extends the width of the approach. The double-sided tape at 142 and 144 is very thin, about 0.1 mm thick, and preferably about 2–3 inches wide. The double-sided adhesive tape contains a removable protective strip 129 over the adhesive on one side of the tape prior to attachment. Optionally, a fill-in strip 136 of polymeric material can be utilized between the approach sheets 140 of the adjacent lanes (FIG. 6).

The sheet 130 is formed of an extruded polymer. Preferably, a removable protective film is applied to at least one surface of the polymer sheet after the polymer is extruded. Polymer sheet 140 is formed in the same way. The polymer sheets are extruded to ultimately lie flat. The polymer sheet is then transported in a roll to the bowling establishment.

When installing the sheet material on the bowling lane, a roll of polymer sheet is typically used. Once the lane has been prepared, if necessary, by sanding and base coat finishing the existing lane surface, the roll of polymer sheet 130 is laid down on the bowling lane and unrolled over the area to be covered. Once unrolled, the protective film/layer may be removed from extruded polymer sheet 130 prior to installation. Unrolling the sheet and/or removing the protective film creates a static charge that attracts particles to the bottom surface of sheet 130. Typically, any remaining dust or other small particles on the lane surface adhere to the sheet due to the static forces. If this occurs, the sheet may be inverted (flipped over). This exposes the particles attached to the polymer sheet by the static forces such that they may be removed with a towel.

In order to easily flip the polymer sheet, the pin deck end of the polymer sheet is pulled over the polymer sheet until it lies on the approach. Then, the looped end is grasped and pulled onto the approach. There are now four polymer sheet sections overlying one another. Next, the bottom layer of the polymer sheet is pulled out from the looped end (now located about 15 feet down the lane). When the installer approaches the pin deck end, the polymer sheet will flop over itself. The material may then be positioned as needed.

Figure 8:
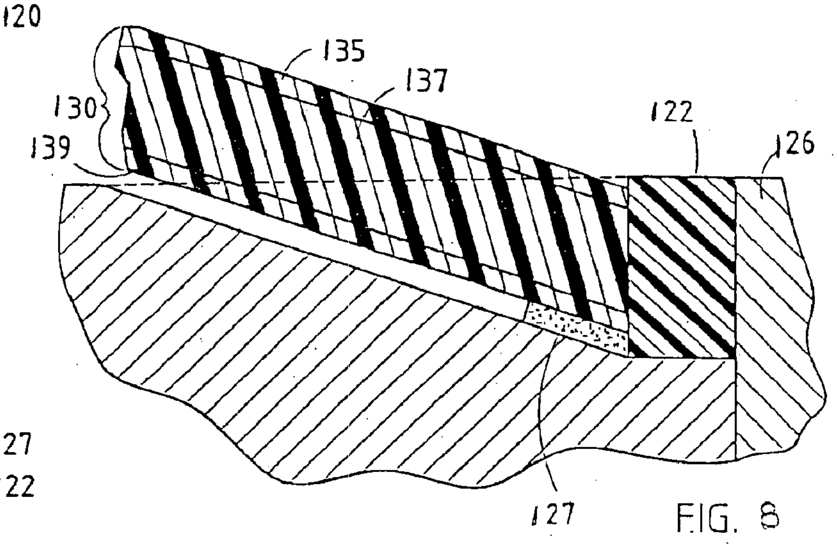
FIG. 8 is a greatly enlarged, fragmentary side elevational view of another embodiment of the juncture of the approach and the lane at the foul line.

If the sheet material is not used on the approach area, then the leading edge of the sheet material at the foul line is laid after the underlying wood is beveled, e.g., about 1.5 mm deep at the foul line, for a sheet material of 1.25 mm thickness, angling up to the rest of the lane surface in a 6 inch distance or so, as depicted in FIG. 8. This is to assure that polymer sheet 130 will not extend above the level of the approach so as to inhibit the bowler's sliding action in the event the bowler slides across the foul line. The sheet is then slid, as necessary, until one end is adjacent the foul line and the opposite end is at the far end of the pin deck. The top surface is preferably then cleaned with a slightly damp lint-free towel bar or the like. This removes any dirt and dust from the polymeric sheet and should especially be done if the sheet has been inverted to expose dust or other particles that were on the lane, but that adhered to the sheet due to static forces, as discussed above.

Once the polymer sheet is positioned so that it is straight and covers the entire lane surface, it can be temporarily attached to the lane with the few pieces of double-sided tape. It may be permanently attached. Then, a cutting tool of the type commonly used for cutting polymers is preferably employed to trim the side edges of the polymer sheet so that the width of the sheet is equal to or slightly less than the underlying lane width. Preferably, the edges are about 0.1 mm or so less width than the lane, on each side of the lane but within the ABC guidelines. Then the front and back ends are trimmed to the proper length, if necessary. Preferably, the top surface of the sheet material is then buffed slightly as with a rotary floor machine, at least for the first approximately 30–45 feet of the lane. The cut edges are then smoothed and typically beveled.

After the surface of the extruded polymer sheet is cleaned as necessary, it is attached at the foul line with the double-sided tape 127 about 2 inches wide and about 0.1 mm thick over the width of the material. Two pieces of 2 inch wide tape may also be used. For ease of installation, the double-sided tape should be attached to the lane first. It may be desired not to further secure the rear end of the polymer sheet at the pin deck until the lane has been used and/or conditioned with a common bowling lane conditioner a few times to assure that it lies completely flat. Ultimately, the rear end of the polymer sheet is preferably attached to the underlying lane surface by a pair of approximately 2 inch by 4 inch pieces of double-sided tape 128 at the rear corners of the pin deck. The sheet material can be buffed periodically to assure uniformity of surface characteristics. With these simple steps completed, the sheet material has been found by extensive testing to be suitable for extended bowling.

The polymer sheet surface can be smooth or have a matte finish. As discussed above, when no Teflon® is incorporated into the polycarbonate layer, treatment may be necessary to obtain a matte finish, while no such treatment is necessary when Teflon® is used because the reconditioning layer is less glossy. If, at any time, it is desired to remove the polymer sheet for treatment of the lane in any fashion, or applying decorative surfaces or the like beneath it, this can be readily done by simply releasing the double-sided tape at the ends and shifting the polymer sheet off the lane.

Installation of extruded polymer sheet 140 on the approach is done in similar fashion except that the entire width of the sheet 140 on the approach has the double-sided tape 142 on both the edge portion adjacent the foul line and at 144 on the leading edge portion, as depicted in FIG. 6.

Figure 9:
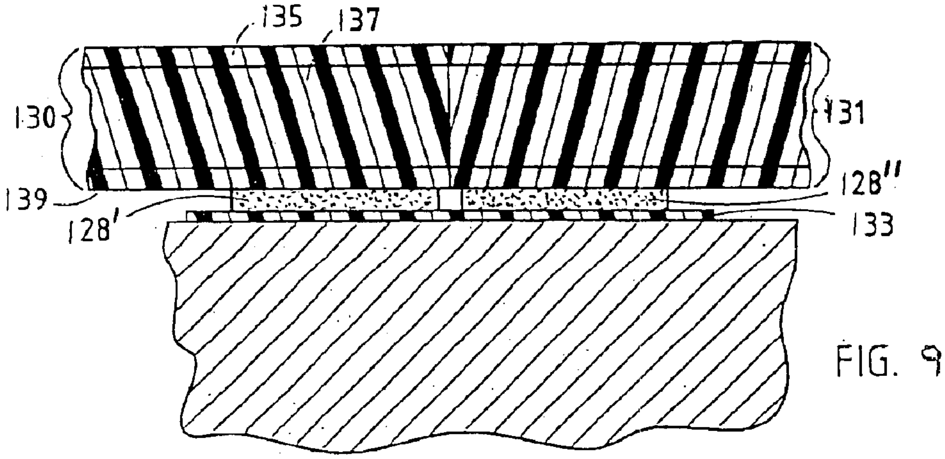
FIG. 9 is a greatly enlarged, fragmentary side elevational view of an embodiment of the juncture at the lane and the pin deck.
Figure 10:
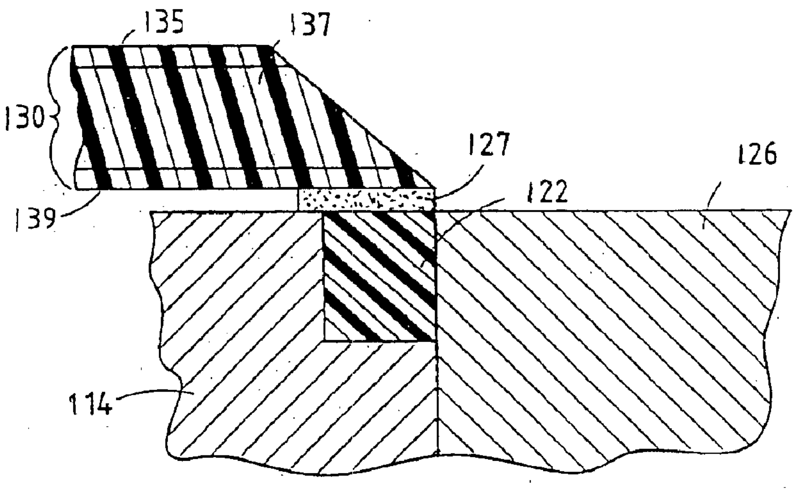
FIG. 10 is a greatly enlarged, fragmentary side elevational view of an embodiment showing the extruded sheet on a synthetic lane and without applying an extruded sheet on the approach.
Figure 11:
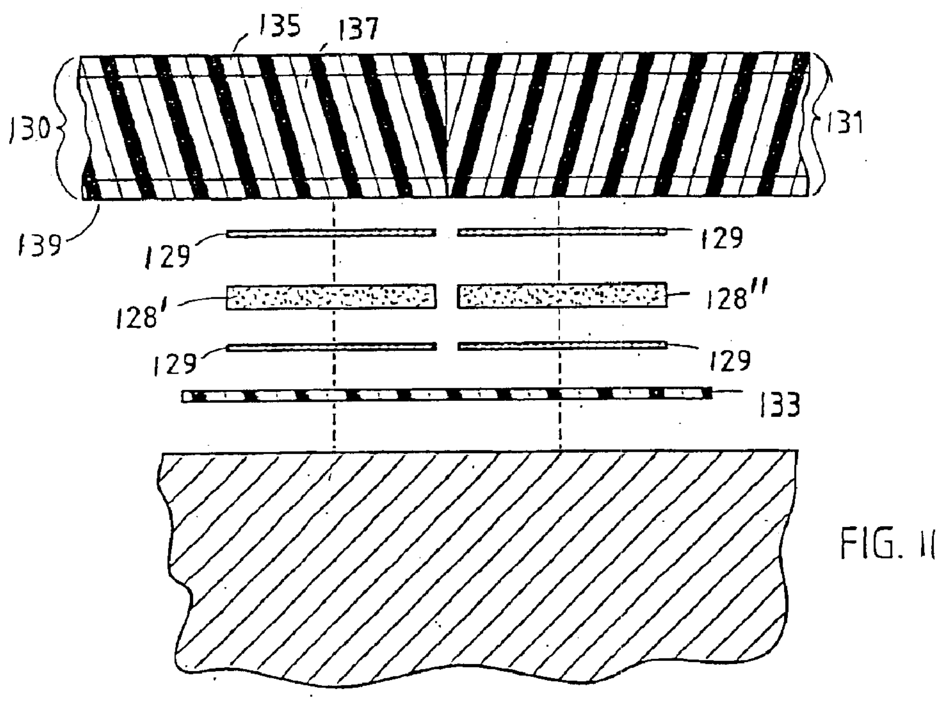
FIG. 11 is a greatly enlarged, exploded side elevational view of an embodiment of the juncture at the lane and the pin deck.

If it is desired to have a separate layer of sheet material on the pin deck 124, this can be done in a manner indicated in FIG. 9 by having polymer sheet 130 terminate at the front of the pin deck, applying a separate polymer sheet 131 on the pin deck, there being underlying double-sided tape 128' beneath the rear edge of polymer sheet 130, and tape 128" beneath the forward edge of polymer sheet 131, adjacent to each other, and a very thin layer of clear plastic film 133, e.g., about 0.005 inch thickness, beneath both of these strips of tape. The tape may have an adhesive protective strip 129 on both sides (FIG. 11). However, typically the adhesive tape has a single top protective strip, and the adhesive is rolled onto the surface when applied. Once unrolled, the top protective strip 129 is removed to reveal the adhesive. Additionally, if there is another section of the lane, e.g., the head section, which is damaged, it can be cut out and replaced with the sheet material of appropriate length. A separate piece of a very thin clear plastic, with adhesive on one side, may also be used to adhere the sheet to the lane, as disclosed in U.S. Pat. No. 4,795,152.

Also, a lubricious polymeric material containing lane finishing material may be applied as a lane finish directly to any portion of the surface of the lane, the pin deck, or to the polymer sheet.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. A UV light fluorescing film for bowling lanes, comprising:

a thin transparent film of a material selected from the group consisting of polyesters, polycarbonates, polyurethane, polystyrenes, polypropylene, polyethylene, polyvinyl chloride, acrylics, polyurethane, fluorocarbon polymers and nylon;

a pressure sensitive adhesive on one side of said film selected from the group consisting of acrylic, vinyl acrylic copolymer, rubber resin and silicone pressure sensitive adhesives; and an ultraviolet light sensitive dye or pigment that is essentially colorless in daylight but fluoresces in ultraviolet light dispersed in said adhesive.

2. A UV light fluorescing film as set forth in claim 1, wherein:

said film has a total thickness between about 0.63 and 2.50 mm, and is made from a polycarbonate material.

3. A UV light fluorescing film as set forth in claim 2, wherein:

said film comprises a first layer and a second layer underlying said first layer; and said first layer comprises a lubricious polymeric material and polycarbonate.

4. A UV light fluorescing film as set forth in claim 3, wherein:

said first layer includes an optical brightener.

5. A UV light fluorescing film as set forth in claim 4, wherein:

said second layer includes;

a color tinting material; and an ultraviolet light blocker.

6. A UV light fluorescing film as set forth in claim 5, wherein:

said film further includes a third layer underlying said second layer.

7. A UV light fluorescing film as set forth in claim 6, wherein:

said film has an undersurface free of adhesive.

8. A UV light fluorescing film as set forth in claim 7, wherein:

said film comprises a mixture of about 5–20 percent of a lubricious polymeric material and correspondingly about 80–95 percent polycarbonate.

* * * * *